(12) United States Patent
Miller, III

(10) Patent No.: US 6,632,362 B2
(45) Date of Patent: Oct. 14, 2003

(54) VACUUM RETORT ANAEROBIC DIGESTION (VRAD) SYSTEM AND PROCESS

(76) Inventor: Herman P. Miller, III, P.O. Box 1769, Stockton, CA (US) 95201-1769

( * ) Notice: Subject to any disclaimer, the term of this patent is extended or adjusted under 35 U.S.C. 154(b) by 91 days.

(21) Appl. No.: 09/766,140

(22) Filed: Jan. 19, 2001

(65) Prior Publication Data

US 2002/0096471 A1 Jul. 25, 2002

(51) Int. Cl.[7] .................................................. C02F 3/28
(52) U.S. Cl. .................... 210/603; 210/609; 210/613; 210/631; 210/181; 210/205; 210/258
(58) Field of Search ................................ 210/603, 609, 210/612, 613, 615, 616, 617, 631, 175, 180, 181, 205, 252, 258, 259

(56) References Cited

U.S. PATENT DOCUMENTS

| | | | | |
|---|---|---|---|---|
| 4,076,515 A | * | 2/1978 | Rickard | 71/10 |
| 4,093,544 A | * | 6/1978 | Ross | 210/718 |
| 4,198,292 A | * | 4/1980 | Snider et al. | 210/612 |
| 4,211,647 A | * | 7/1980 | Friedman et al. | 210/603 |
| 4,375,412 A | * | 3/1983 | Schimel | 210/603 |
| 4,401,565 A | * | 8/1983 | Schimel | 210/258 |
| 4,642,187 A | * | 2/1987 | Schimel | 210/258 |
| 4,690,755 A | * | 9/1987 | Friedman et al. | 210/96.1 |
| 5,015,384 A | * | 5/1991 | Burke | 210/603 |
| 5,185,079 A | * | 2/1993 | Dague | 210/603 |
| 5,296,111 A | * | 3/1994 | Suzuki et al. | 205/742 |
| 5,525,228 A | | 6/1996 | Duague et al. | 210/603 |
| 5,540,839 A | * | 7/1996 | Pirt | 210/612 |
| 5,587,079 A | * | 12/1996 | Rowley et al. | 210/603 |
| 5,630,942 A | | 5/1997 | Steiner | 210/603 |
| 5,651,890 A | * | 7/1997 | Trost | 210/603 |
| 5,922,204 A | * | 7/1999 | Hunter et al. | 210/603 |
| 5,976,372 A | * | 11/1999 | Vesterager | 210/603 |
| 6,291,232 B1 | | 9/2001 | Miller | |

* cited by examiner

Primary Examiner—Fred G. Prince

(57) ABSTRACT

This invention pertains generally to anaerobic digesters, and more particularly to a system and process that extends the range of acceptable biomass feedstock concentrations and provides pH process control of all known digestion processes: by the creation of a vacuum or vacuum retort in or before the digester that essentially acts to boil off excess liquid, thickening the liquor of the digester to an optimum value; and to control the pH of the various phases or stages of digestion by separating the component products of digestion and mixing or diffusing a portion of said component products into the mixing system of each phase of the process. A system and process: that produces a potable water effluent, clean commercially useful by-products, zero environmental emissions, a very positive ecological impact; and, that has the capability of being completely self powered plus providing energy back to the community or industry that supports or owns it.

29 Claims, 7 Drawing Sheets

Fig. 2

VACUUM RETORT ANAEROBIC DIGESTION (VRAD) SYSTEM AND PROCESS

RELATED PATENT

The invention described herein makes use of the process and system of U.S. Pat. No. 6,291,232, the disclosure of which is incorporated herein by reference.

BACKGROUND OF THE INVENTION

1. Field of Invention

This invention pertains generally to anaerobic digesters and, more particularly, to a system and process that significantly extends the efficiency, control, and applicability of anaerobic digesters to all of the many and variously different liquefied bio-waste products over a wide variety of conditions and concentrations.

2. Introduction and Related Art

Designers of wastewater facilities have always been concerned with energy costs. Historically, however, rather large engineering "houses" have designed wastewater treatment plants (WWTPs) with hydraulic loads of millions of gallons per day.

Designing these plants involved large structures, the design responsibility for each was assigned to a person or group that specialized in that particular function. A process engineer who was forced by the dictates of Federal, State, and local agencies to aim the overall design performance almost entirely with respect to the effluent requirements of these entities determined the make up of the process itself. Although energy considerations have in recent years received some attention little if any serious effort has ever been directed to the energy savings possible by the integration of these processes. Evolution not invention predominated the picture.

As each group perceived a problem in its area of expertise, or if operational problems developed after construction, enterprising engineering, inventor, entrepreneur types were brought into the picture. This approach has resulted in the application of inventive genius to a lot of fixes, a lot of complexity, and a large increase in construction, maintenance, and energy costs in WWTPs.

Aerobic And Anaerobic Processes

Domestic wastewater, liquefied bio-waste, commercial and industrial liquid waste processes have historically used two distinct classes or systems of bacteria to reduce the biosolids contained therein to more biochemically safe water and solids that can be used for fertilizer and a variety of other products. These two bacterial systems are termed aerobic and anaerobic.

The Aerobic Process

Aerobic processes require the mixing of air or pure oxygen into the liquor being treated so that aerobies (aerobic bacteria) grow, attack, and bio-chemically reduce the solids. Aerobic processes are relatively easy to devise and there are many such systems in use worldwide.

The drive for higher and higher quality effluents has contributed to the expansion and proliferation of aerobic processes. However, there are a number of disadvantages to aerobic processes: they are in general open processes that have odor problems; they tend to require large tanks or ponds that require considerable space; and they consume large quantities of energy in the form of electrical power. Sixty to seventy percent of the energy required in modern domestic wastewater treatment plants is directly attributed to aerobic processes.

The Anaerobic Process

Conversely, anaerobic processes can be net energy producers. They operate in closed tanks or vessels devoid of oxygen, at an elevated temperature, are more difficult to control, produce a gas that contains approximately 64% methane (natural gas), 34% carbon dioxide, and 2% hydrogen sulfide. It is the methane component of this raw gas mixture that is valuable for its energy content (nominally 1000 Btu/ft$^3$). Gas production rates are a function of the type and density of the bio-feedstock and general digester efficiency.

Water To Volatile Solids Ratio

The limiting factor that has prevented all wastewater feedstock from being treated anaerobicly is the high ratio of water to bio-solids (volatile solids or VS) contained in the feedstock. Domestic wastewater typically exhibits as little as 0.01% VS. And yet, it is normally difficult to maintain anaerobic action below a minimum threshold of about 3 to 5% VS. Therefore common practice limits anaerobic digestion to that relatively small part of the influent that either settles readily or floats to the top of large primary and secondary sedimentation tanks, thus delegating a very large portion of the influent to aerobic activated sludge processes. The invention described herein completely eliminates this minimum VS requirement so that all biosolid liquor mixtures may be anaerobicly reduced irrespective of their biosolid (VS) concentrations.

Previous Anaerobic Limitations

The energy produced by anaerobic systems in the form of methane gas is a direct function of the quantity of biomass reduced (VSR) in the process. Therefore, the net positive energy generated is normally severely limited by the water to VS ratio of the digester influent, irrespective of the several chemical-thermal-mechanical factors that determine digester efficiency. And, depending upon the feedstock there has normally been an operating point at which it becomes more efficient to delegate a portion of the treated influent to aerobic processing. This limitation can be overcome to some extent by the addition of external biosolids such as: food, animal, agricultural, grass clippings, tree trimming, cardboard, and other bio-waste products to the anaerobic influent. Therefore, the ability of this invention to control and maintain the desired water to VS ratio in the digester eliminates the necessity for, but not the usefulness of, such considerations.

Anaerobic Temperature

Anaerobic digesters have been operated in a number of temperature ranges. This invention is applicable to all anaerobic digesters regardless of temperature. Most common digesters operate in the mesophilic range of approximately 35° C. or the thermophilic range (55° C.). The preferred embodiment and the description of this invention refer to thermophilic operation.

Raw Gas Constituents

In an anaerobic reactor, retort, or vessel operated in the thermophilic bacterial temperature range of approximately 53 to 58° C. (nominally 55° C.) there is a certain space above the liquor (hereinafter referred to as the dome, however this reference does not necessarily limit the shape of the vessel) that collects the raw gas produced in the reactor by the anaerobic action. The constituents of this raw gas vary a few percentage points but generally may be expressed as being 60% methane ($CH_4$), 31% carbon dioxide ($CO_2$), 1% hydrogen sulfide ($H_2S$), and 8% water vapor ($H_2O$).

The Vacuum Retort

The partial pressures of these gases are a function of the temperature and pressure in the dome. The quantity of methane, carbon dioxide, and hydrogen sulfide available to this mixture is limited by the digester gas production rate. Only the water content of the liquor, the temperature of the vessel, and the pressure in the dome however, limit the quantity of the water vapor available. Since the liquor is generally more than 95% water the quantity of water vapor available may be considered infinite within the confines of this discussion. And, since the temperature of the vessel is set by the anaerobic requirement the surface of the liquor may be considered constant at 55° C. However, the total pressure and to some extent the temperature in the gaseous space of the dome above the liquor may be varied widely and in itself will have virtually no effect upon the temperature or operation of the digestion process. Decreasing the pressure will increase the partial pressure of water vapor increasing the ratio of water vapor to gas. It is a major action and purpose of this invention to decrease the absolute dome pressure (creating a vacuum); thus increasing the percentage of water vapor; drawing off this water vapor; to result in the lowering of the water to VS ratio in the vessel, at a rate and to an extent that maximizes methane production and VSR.

The Retort Process

At the temperature of 55° C. water boils under a vacuum of 12 psi relative to standard conditions. In the range between atmospheric pressure (14.7 psia) and 12 psi vacuum (3 psia) the water vapor available to be drawn off by the process increases in a linear fashion and heat is drawn from the process. At the boiling point however, the rapid boiling of the water impedes further reduction in pressure. At this low pressure the rate of boiling is a function of the heat of vaporization resulting in a sharp rise in the heat drawn from the system. There is a sharp rise in additional heat that must be applied to the vessel influent in order to maintain thermophilic temperature. This invention provides for the condensation and heat exchange of this primarily water vapor or steam-gas mixture flow to the influent feedstock dramatically reducing the requirement for make up heat to the system. The vacuum created in the retort dome is created and controlled by condensing action and the pumping or pulling off by gravity of this condensate gas mixture. The pumping of this predominantly water mixture by gas diffusion liquid pumping or elevated water column condensation are the preferred embodiments of this invention. Embodiments may be performed by special vortex, centrifugal, or other technology. This invention additionally makes use of the facts: that biosolid feedstock at higher operating temperatures demonstrate improved solids separation characteristics; that hot water, vapor, or steam introduced above the liquor level is more readily drawn off into the condenser heat exchange unit; and that heated feedstock introduced to the dome above the scum layer helps to break up this layer, reduces foaming, and makes use of the additional surface area of this rough and uneven surface to enhance vaporization in the dome.

Raw Gas Mixing

Typically the Raw Gas generated in wastewater, solid waste and/or landfill processes is recycled in order to provide mixing of the liquor in the digestion process. The use of raw gas in mixing is an aid to bacterial growths that break down the bio-solids in the anaerobic digestion process. Raw gas is recycled in the digestion process by one of various methods. The process described herein applies to all gas mixing methods.

Acid And Fermentation Phases

Anaerobic digestion is basically a two-phase process. It is the combined action of two forms of bacteria that live together in the same environment and are commonly referred to as the "acid formers" and "methane fermenters". It has been found advantageous to separate or transition these phases to some degree as an aid to keeping a balance between these two bacteria. Acid formers are abundant in raw sewage. Methane fermenters are not nearly so prevalent and require a pH of about 6.6 to 7.6 to produce. A digester is sensitive to too much food, it may easily become too acidic and "go sour" and fail to produce the desired innocuous dewaterable sludge and valuable methane ($CH_4$) if the acid phase is allowed to predominate. The method described herein separates the components of the mixing gas, controls the volumetric gas flow, and stabilizes the above condition over a much broader range of feed conditions by regulating the content of the mixing gas to the various phases.

Gas Constituents In Mixing

The carbon dioxide content forms carbonic acid ($H_2CO_3$), which when returned to the digester as a component of the mixing gas moves the balance in the direction of the acid formers and can be used to enhance their activity in the acid phase. However the methane component is a valuable constituent both as a gas that may be drawn off the system for energy and as a mixing gas. Many believe that its presence is a further aid to the health of methane fermenters. Natural gas, which contains a high percentage of methane, is sometimes used to restart sour (acidic) digesters. As a mixing gas methane slows the acid forming phase and enhances the fermenting phase. The water vapor and hydrogen sulfide gas that form hydrosulfuric acid a destructively active acid component that makes itself a general nuisance by condensing out in lines, corroding expensive equipment, and the instrumentation used to monitor and control gas flow are entirely removed from the process.

Separating Gas Constituents

Several methods for separating (scrubbing) methane from the other raw gas constituents have been developed. The application of these processes to wastewater treatment plants has not proven practical and/or economically feasible. The method and process described herein not only provides clean methane gas that is dry cold and dense and does it at atmospheric pressure but also overcomes all of the drawbacks connected with other processes and enhances the operational efficiency of the plant operation.

Thermophilic Operation

The Thermophilic Digestion Process is not new. However, like the various gas scrubbing techniques, it has seldom previously been considered an economically viable solution to the treatment of biosolids in a full sized digester. Until the advent of this invention there has never been available an economical heat source capable of maintaining the additional 20° C. required for thermophilic operation. Thermophilic digestion is three (plus) times as fast as mesophilic digestion. For instance, this process can reduce the same amount of volatile solids in 10 days that a mesophilic digester will reduce in 32 days. It follows that there is three (plus) times the production of methane gas. By providing the heat required to raise and maintain the operating temperature at the thermophilic range the "basic" digester operating efficiency has increased by a factor of three.

Raw Gas Operation Limitations

Utilization of the methane energy component of this raw gas has been hampered by the presence of the other by-product components of anaerobic digestion. The most insidiously harmful of these components with respect to repair, maintenance and replacement of equipment in the mixing and/or gas to energy systems (i.e. pumps, blowers, compressors, boiler tubes, cylinders, etc.) is the condensing water vapor and the dilute hydrosulfuric acid ($H_2SO_4+H_2O$) product of the hydrogen sulfide and water constituents. Operations personnel soon become discouraged by the unreliability, high maintenance costs, and the low time between failures associated with these equipments. So much so in fact that many plants have abandoned the use of raw gas altogether in favor of natural gas (domestic or pipeline), opting to flare-off the raw digester gas and its harmful components to the atmosphere. The invention herein described greatly increases the traditional mean time between failure (mtbf) of all of these equipments.

In addition, the volumetric inefficiency of using a gas that is 40% inert in gas-engines used for pumping or generating systems requires much larger and more expensive engines than the service requirement would otherwise dictate, accompanied by a corresponding reduction in operating efficiency. Additionally passing this carbon dioxide through the combustion process increases the "green house" effect upon the atmosphere. The invention herein described eliminates all of these drawbacks and limitations providing a positive environmental impact.

Sludge Thickening

Secondary sludge (i.e. sludge from the secondary sedimentation basins and the aerobic treatment processes) tends to be thinner than primary sludge (i.e. sludge from the primary sedimentation basins). In order to handle secondary sludge effectively, whether it is used in direct land application or cycled through the digester, it is customary to thicken this sludge. This requires rather elaborate and expensive apparatus with certain chemicals such as polymers to aid the process. By cycling all sludge through the retort digester the requirement for a separate sludge thickening process is eliminated. Thickening of the sludge in the digester takes place automatically and continually as the water is removed from the vacuum retort digester.

Pasteurization

Most recently the United States Environmental Protection Agency in the Code of Federal Regulations 40 Section No. 503 has mandated that in order for sludge to be classified as Class A for unrestricted use or access land application it must be pasteurized to below harmful pathogens levels. Subjecting sludge to thermophilic temperatures for as little as one quarter hour provides this pasteurization. Systems of this type have been in use in Europe for a number of years and are becoming more prevalent in the United States. The equipment involved in such a process is expensive, and only augments digestion process meanwhile adding complexity to the treatment process. The method and process contained herein subjects all sludge to pasteurization, completely eliminating the need for a separate process while providing a positive environmental impact.

Effluent Ph

When applied to retrofit digesters or installed as a partial treatment process in an existing plant in which the distilled process water is to be added to the plant effluent only partial de-carbonization need take place in the system. The remaining carbonization buffers effluent water. Typically the effluent of wastewater treatment plants tends to run alkaline (i.e., pH in excess of 7.0). In a large number of plants with certain types of industrial influent the pH range becomes excessive. Equipment is being installed in WWTPs today solely for the injection of bottled CO2 gas into the effluent prior to chlorination or other disinfection process. Carbon dioxide provides superior process control by virtue of its self-buffering characteristics. It is being used to replace older systems that use hydrochloric acid, sulfuric acid or acetic acid. The method and process contained herein completely eliminates the need for either of these systems. The carbon dioxide and hydrogen sulfide removed from the raw digester gas is dissolved in the water that is inserted into the secondary effluent stream. In addition, maintaining this buffer reduces the amount of chlorine required for disinfection and reduces the discharge of carbon dioxide to the atmosphere.

OBJECTS AND SUMMARY OF THE INVENTION

It is in general an object of the invention to provide a new and improved anaerobic digestion system and process.

Another object of the invention is to provide an anaerobic system and process of the above character which provide 100% energy independence, zero waste products, zero environmental pollution, potable distilled water production, and a pasteurized fertilizer, sludge or sludge cake product, in a closed bio-thermodynamic systems.

These and other objects are achieved in accordance with the invention by:

(a) Concentrating the liquor in the digester and boiling off water in excess of the amount required for optimizing the digestion process, by creating and controlling a vacuum in the enclosed space above the liquor;

(b) Producing clean, dry, pure methane gas from the raw gas produced in the digester, as disclosed in U.S. Pat. No. 6,291,232, and utilizing that gas to power and control the process and as a saleable pipeline quality gas and/or electrical energy producing product;

(c) Producing pure carbon dioxide gas, by de-carbonating the effluent water, and utilizing that gas to control the digester operation and as a saleable by-product of the process;

(d) Controlling the pH of the digester to increase the digestive action without the use of chemical additives (Steiner 5,630,492), by selectively reintroducing the separated components of the raw gas into the several phases or stages of the digester as an injection additive to the mixing liquor or as the mixing gas itself;

(e) Providing a biologically and chemically pure liquid or potable distilled water effluent by condensing out the water vapor produced in paragraph (a) above; and stripping out all the dissolved gas constituents of that condensate;

(f) Providing a system and process for 100% digestible volatile solids reduction (VSR), that provides extreme flexibility and control of solids retention time (SRT), and insures the production of completely pasteurized biosolids by eliminating the possibility of short-circuiting within the digester from effecting pasteurization;

(g) Providing a vacuum drying system for post digester sludge drying and/or sludge cake production, by extending and utilizing the vacuum created in the digester dome to a drying oven; and (h) Producing the useful, saleable chemical by-product sodium sulfate (Epson Salts, and an ingredient in detergents, ink and other products), as a first step precipitant during the reactive neutralization of the chilling water supply by the reduction of hydrogen sulfide with sodium hydroxide.

The invention may be used as a standalone liquid waste (wastewater) plant or as a progressive retrofit or addition to an existing plant. This invention is applicable to and improves the cost effectiveness of wastewater treatment plants with flows as low as a few thousand gallons per day to plants with flows of several hundred million gallons per day and with biomass concentrations as low as 0.005% VS (volatile solids) concentrations. The invention is applicable to: all currently known digester systems, including but not limited to single and multi-phase, multi-staged, temperature phased (U.S. Pat. No. 5,525,228), acid phased, mesophilic, thermophilic, suspended growth, up-flow, down-flow, granular, enhanced granular, fluidized bed, attached growth, and the various combinations of the same; including but not limited to those digesters that employ filter media whether fully or partially packed.

BRIEF DESCRIPTION OF THE DRAWINGS

FIG. 2 is a schematic diagram of another embodiment of an anaerobic digestion system incorporating the invention which utilizes a water to volatile solids ratio that results in operation in a higher energy mode and eliminates the need for a major heat exchanger.

DETAILED DESCRIPTION

Figure 1:
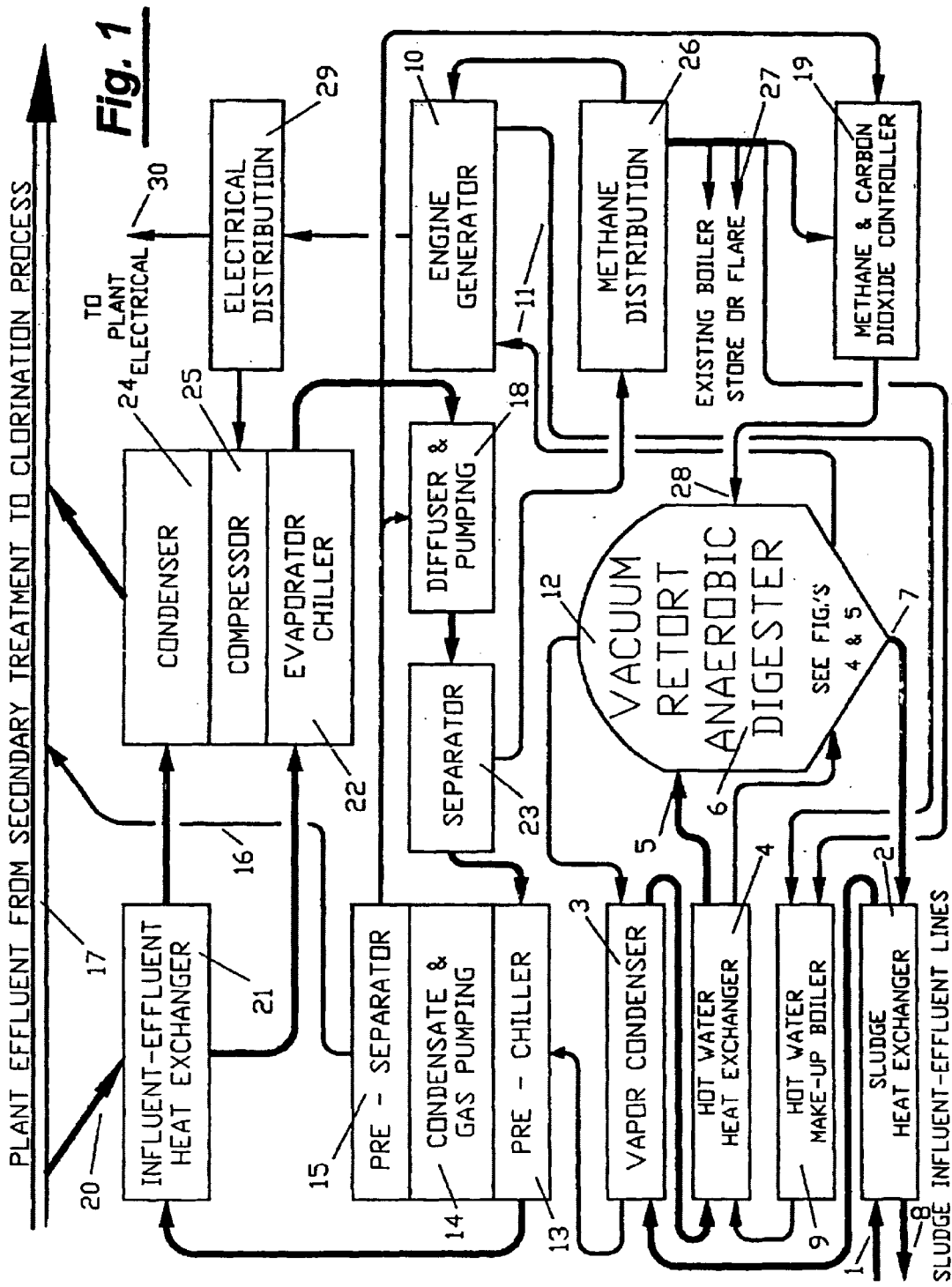
FIG. 1 is a schematic diagram of one embodiment of an anaerobic digestion system incorporating the invention as might, for example, be utilized in a domestic wastewater plant that has retrofitted its digester process or is splitting its flow between aerobic and anaerobic processes.

In the embodiment of FIG. 1, raw sludge removed from the primary and secondary sedimentation tanks is directed to the process at 1 where it is introduced to heat exchanger 2, raising its temperature. The raw sludge is additionally passed through vapor condenser and heat exchanger 3 and 4 to bring its temperature to above the thermophilic range before being passed through line 5 to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined action of condensing 3, cooling 13, and pumping 14 results in a vacuum in dome 12 that acts to increase the water vapor percentage of the water gas mix allowing for increased pumping at 14 until the desired water removal rate from the digester 6 has been reached. The water-gas mixture leaving pump 14 is pre-separated at 15, and water 16 is directed to the plant effluent line 17, while the gasses are directed to main gas diffuser and pump 18 with a bleed off to methane and carbon dioxide controller 19.

Sufficient water flow 20 is slipstreamed off the plant effluent line 17 to insure complete dissolution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13, heat exchanger 21, and refrigeration condenser 24 absorbing heat and pre-cooling these items to reduce the load on compressor 25.

Pure methane from separator 23 is directed to methane distribution 26, is used to power engine generator 10, boiler 9, as digester pH control 28 through controller 19, and may be optionally sold, as indicated at 27. Electrical power from engine generator 10 is distributed at 29, powers compressor 25, and plant electrical loads 30.

Figure 2:
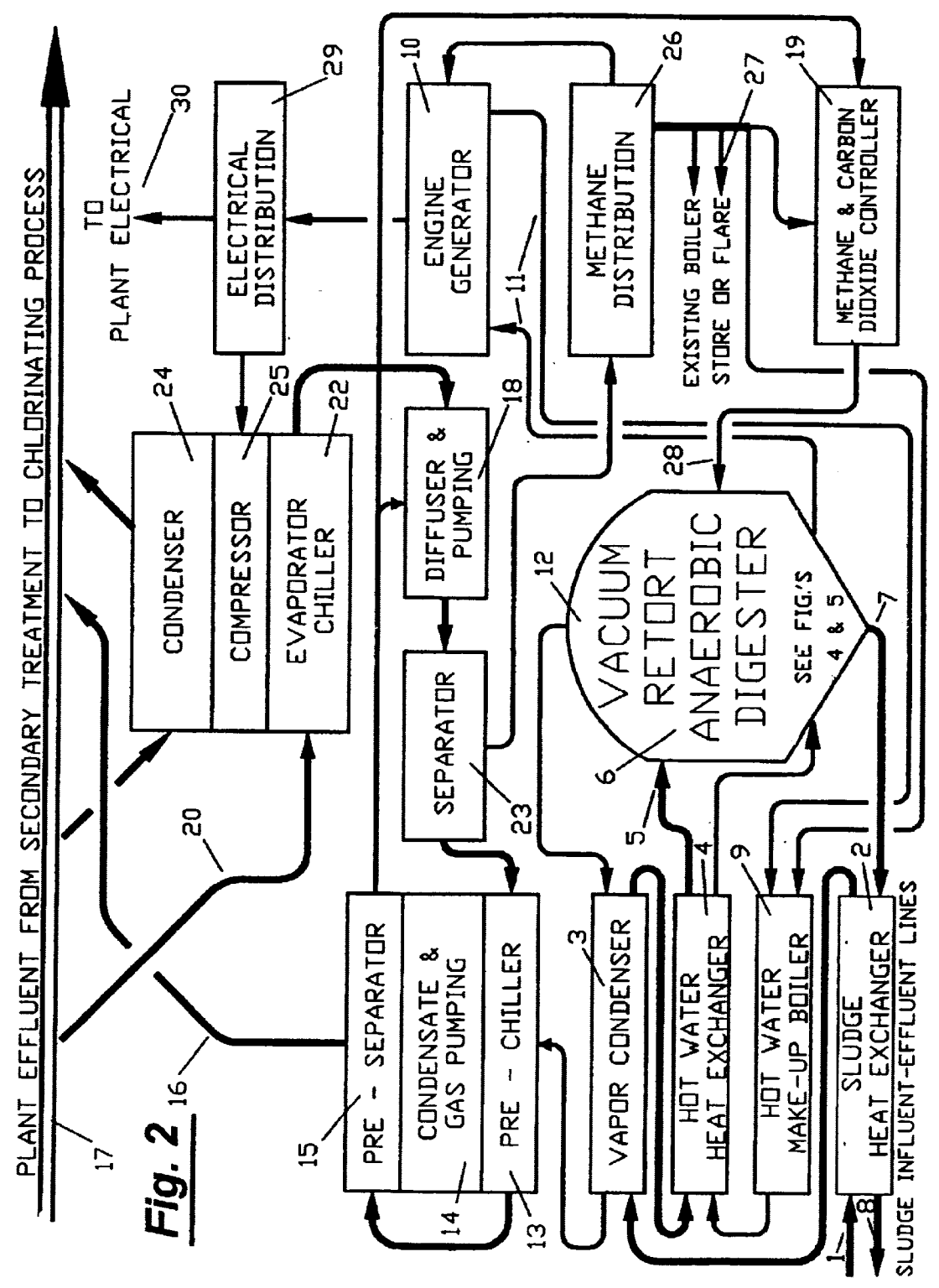

In the embodiment of FIG. 2, raw sludge removed from the primary and secondary sedimentation tanks is directed to the process at 1 where it is introduced to heat exchanger 2, raising its temperature. The raw sludge is additionally passed through vapor condenser and heat exchanger 3 and 4 to bring its temperature to above the thermophilic range before being passed 5 to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined actions of condensing 3, cooling 13, and pumping 14 result in a vacuum in dome 12 that acts to increase the water vapor percentage of the water gas mix allowing for increased pumping of this distilled water and gas mixture at 14 until the desired water removal rate from the digester 6 has been reached. The water gas mixture leaving pump 14 is pre-separated at 15, water 16 is directed to the plant effluent 17, while the gases are directed to main gas diffuser and pump 18 with a bleed off to methane and carbon dioxide controller 19.

Sufficient water flow 20 is slipstreamed off the plant effluent line 17 to insure complete dissolution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13 is joined with distilled water 16 added to plant effluent 17. Upstream Water 17 is passed through refrigeration condenser 24 absorbing heat and cooling the condenser as dictated by the load on compressor 25.

Pure methane from separator 23 is directed to methane distribution 26, is used to power engine generator 10, boiler 9, as digester pH control 28 through controller 19, and may be optionally sold 27. Electrical power from engine generator 10 is distributed at 29, powers compressor 25, and plant electrical loads 30.

Figure 3:
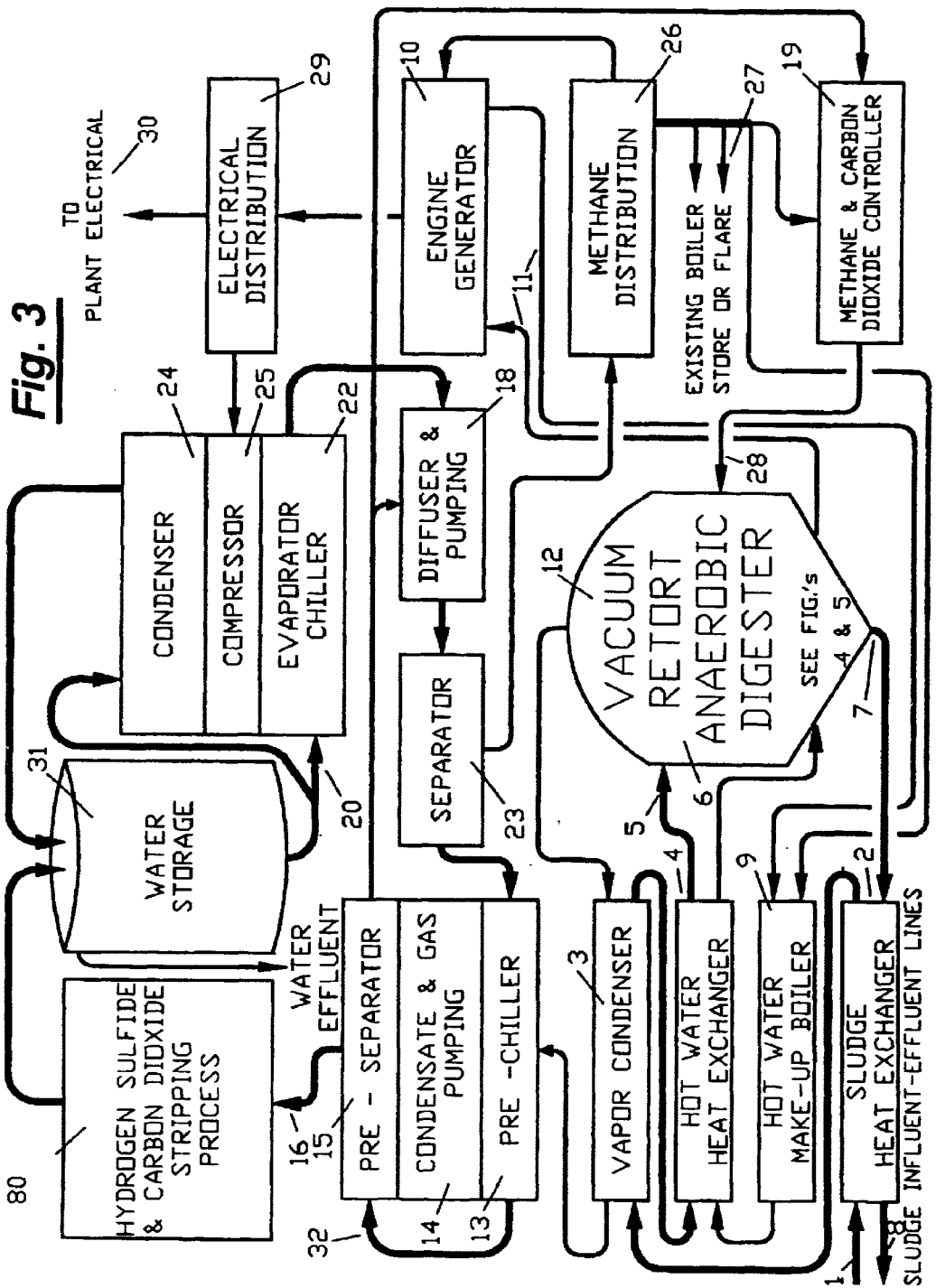
FIG. 3 is a schematic diagram of one embodiment of another anaerobic digestion system incorporating the invention as might, for example, be utilized in a self-contained, fully anaerobic wastewater treatment process in which the system process water is used as the dissolution medium.

In the embodiment of FIG. 3, liquefied biomass feedstock is directed to the process at 1 where it is introduced to heat exchanger 2, raising its temperature. The feedstock is additionally passed through condenser and heat exchanger 3 and 4 to bring its temperature to above the thermophilic range before being passed 5 to the digester 6, insuring that any possible short circuiting in the digester will not prevent pasteurization. After digestion, the thickened sludge 7 returns to heat exchanger 2 before passing to sludge disposal line 8. A hot water or steam boiler 9 together with water jacket heat from engine generator 10 forms a heat loop 11 supplying heat to exchanger 4 and digester 6. Gas and water vapor exit the dome of the digester 12. The vapor of the mixture is condensed in 3 and passes along with the gas to pre-chiller 13 where it is further cooled and passes to gas diffuser pump 14. The combined actions of condensing 3, cooling 13, and pumping 14 result in a vacuum in dome 12 that acts to increase the water vapor percentage of the water gas mix allowing for increased pumping of this distilled water and gas mixture at 14 until the desired water removal rate from the digester 6 has been reached. The water gas mixture leaving pump 14 is pre-separated at 15, water 16 is mixed with gas-water mixture 32 and directed to gas removal 80 and thence to storage 31, while the gases are directed to main gas diffuser and pump 18 with a bleed off to methane and carbon dioxide controller 19.

Sufficient water flow 20 is directed from storage tank 31 to insure complete solution of carbon dioxide and hydrogen sulfide at a temperature close to freezing in diffuser 18. Water 20 passes through system chiller 22 to diffuser pump 18 where carbon dioxide and hydrogen sulfide are completely dissolved in solution leaving methane to be separated in 23. The cold water containing the dissolved gasses pass through pre-chiller 13, line 32 and is joined with distilled water 16, stripped of carbon dioxide and hydrogen sulfide 17 and added to storage 31. Storage water 31 is cycled through refrigeration condenser 24 absorbing heat and cooling the condenser as dictated by the load on compressor 25.

Pure methane from separator 23 is directed to methane distribution 26, is used to power engine generator 10, boiler 9, as digester pH control 28 through controller 19, and may be optionally sold 27. Electrical power from engine generator 10 is distributed at 29, powers compressor 25, and plant electrical loads 30.

Figure 4:
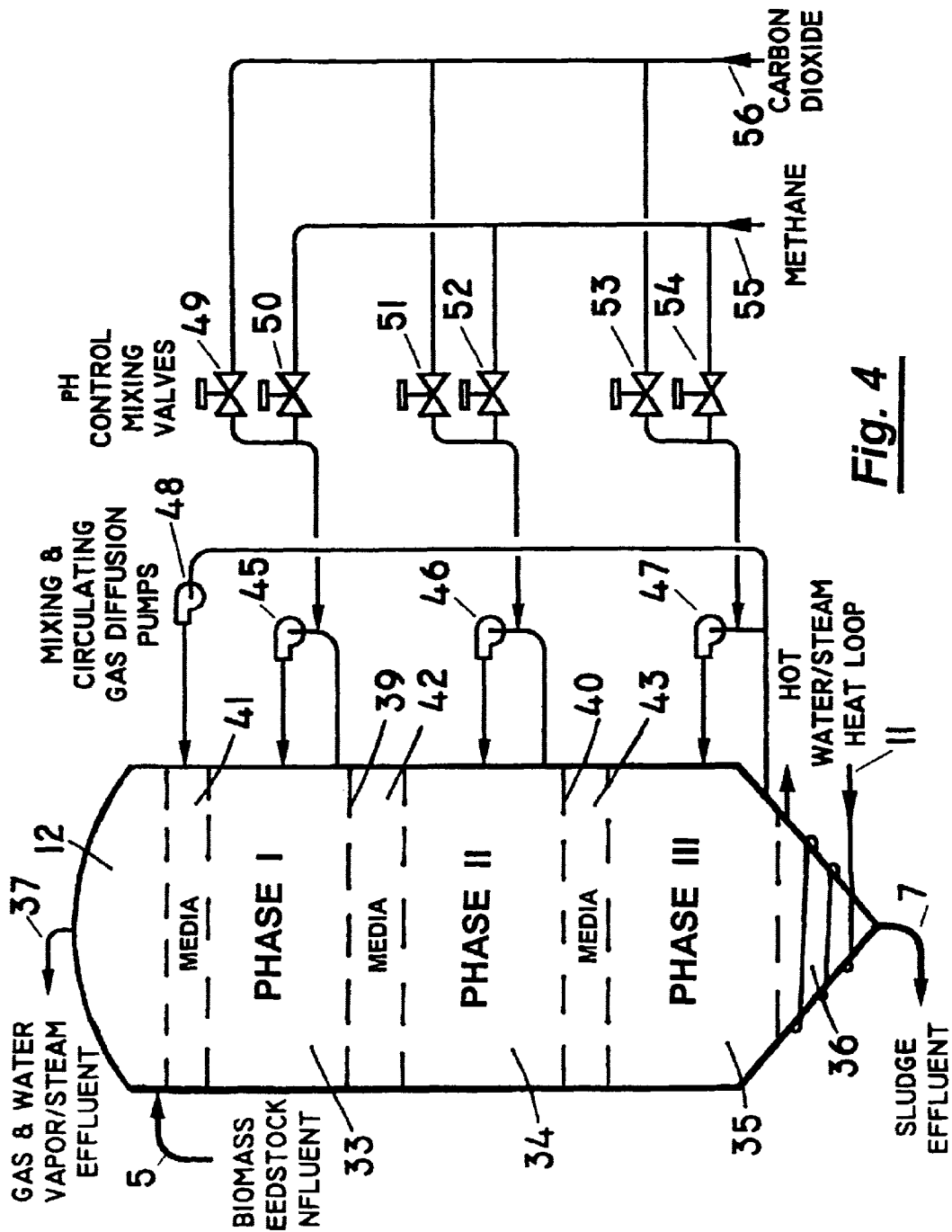
FIG. 4 is a more detailed schematic diagram of an embodiment of a single stage multi-phase anaerobic digester unit with pH control which is particularly suitable for use in the embodiments of FIGS. 1, 2, 3, 6, and 7.

In FIG. 4, a preferred embodiments of invention a multi-phase digester is depicted schematically. Grid separation and partially packed floating media are depicted together with the liquid-gas mixing and pH control system. Pre-heated biomass feedstock 5 is fed to digester dome 12, where its vapor content along with the gas generated in the digester phases 33, 34, 35, and 36 are removed under vacuum at line 37 and a concentrated digested sludge is removed at line 7. Grids 39 and 40 separate the floating media 41, 42, and 43. Digester phases 33, 34, 35, and 36 are maintained at thermophilic temperature (55° C.) by heat loop 141. Liquid-gas mixing maintained by gas diffusion pumps 45, 46, and 47 together with substrate return pump 48. Automatic control valves 49 through 54 regulate the gas or gas mixture from methane supply 55 and/or carbon dioxide supply 56 as required to maintain the optimum pH in each phase.

Figure 5:
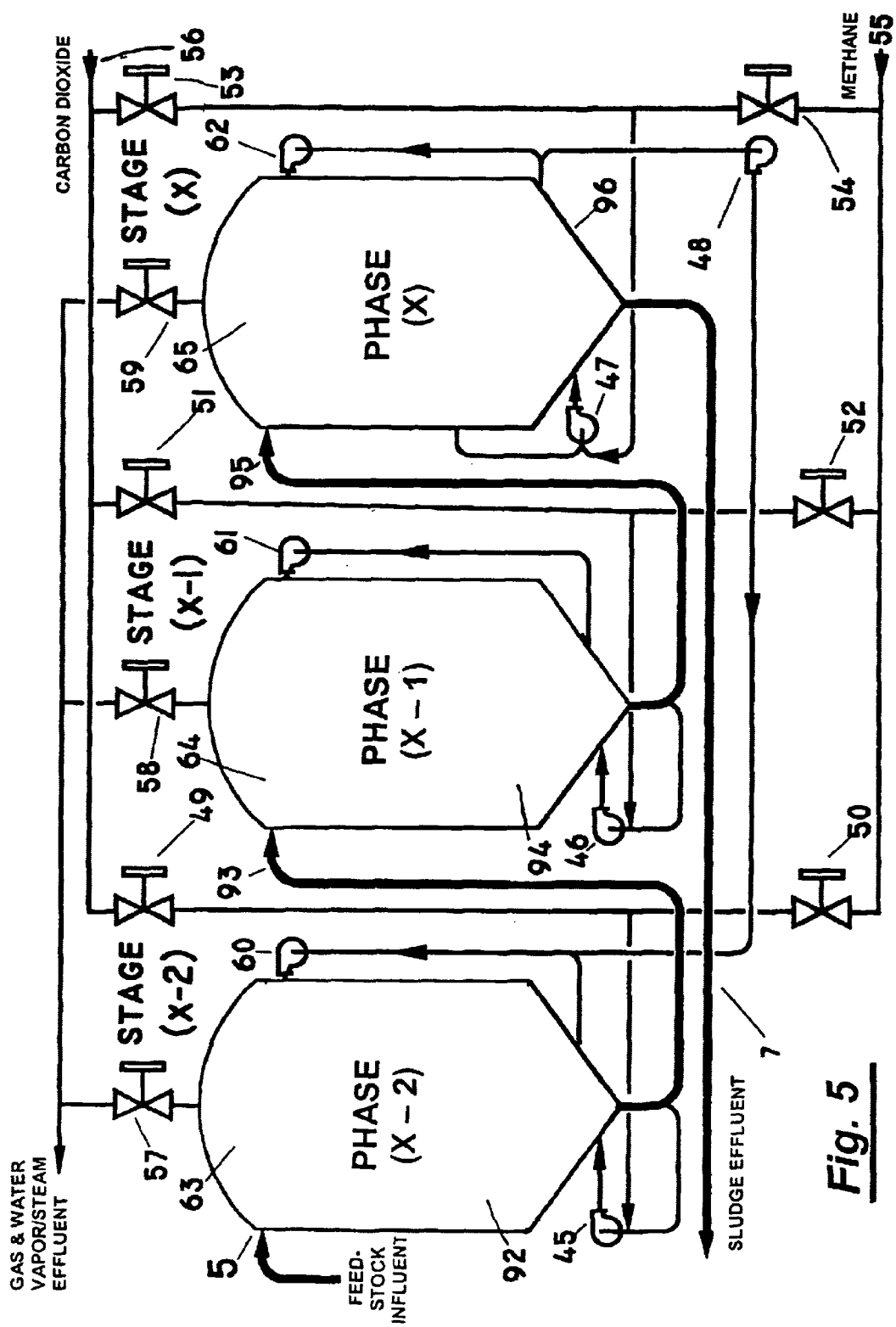
FIG. 5 is a schematic diagram of one embodiment of a multi-stage (series connected), multi-phase anaerobic digester bank with pH control which is particularly suitable for use in the embodiments of FIGS. 1, 2, 3, 6, and 7.

FIG. 5 illustrates a multi-stage, multi-phase digester with feed and pH control. Liquefied biomass feedstock (domestic and/or other) is applied 4 at 5 to the first stage digester 92, through line 93 to second stage digester 94 and finally to third stage digester 96 through line 95. Digested sludge is directed from the final stage by way of line 7. Gas diffusion pumps 45, 46, and 47 circulate the liquid-gas mixture in each stage 92, 94, and 96. Automatic control valves 49 through 54 control the pH in each stage and/or phase by adjusting the flow of methane 55 and/or carbon dioxide 56 to the diffusion pumps 45, 46, and 47. Automatic control valves 57, 58, and 59 isolate the stages and control the relative dewatering rates of each stage by controlling the vacuum in domes 63, 64, and 65. Circulating pumps 60, 61, and 62 re-circulate substrate in each stage and pump 48 re-circulates substrate from the last stage 96 to digester 92 to insure favorable inoculums.

Figure 6:
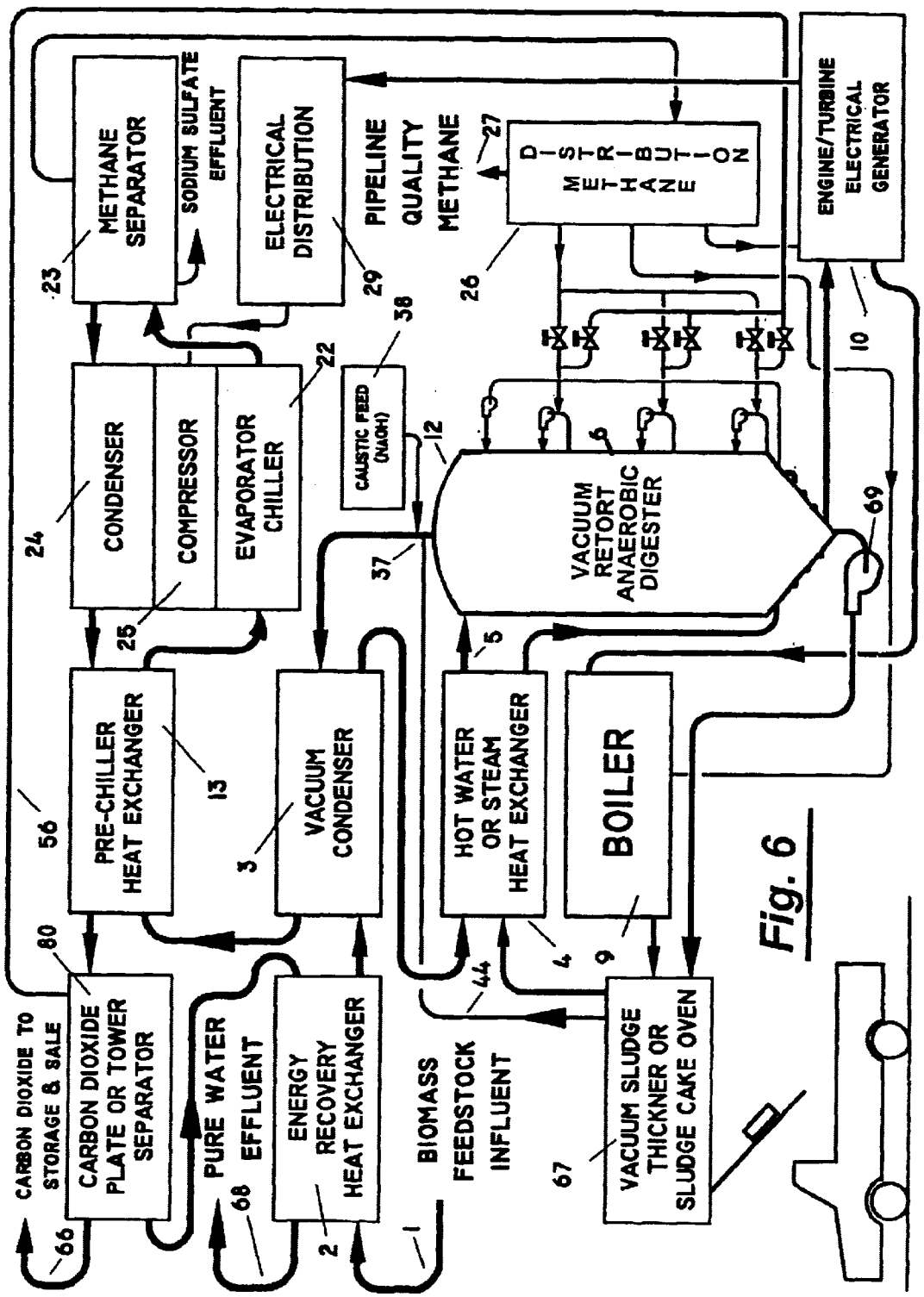
FIG. 6 is a schematic diagram of another embodiment of an anaerobic digestion system according to the invention, which is suitable for use as a stand-alone process system with full pH and sludge thickening control, and process optimization.
Figure 7:
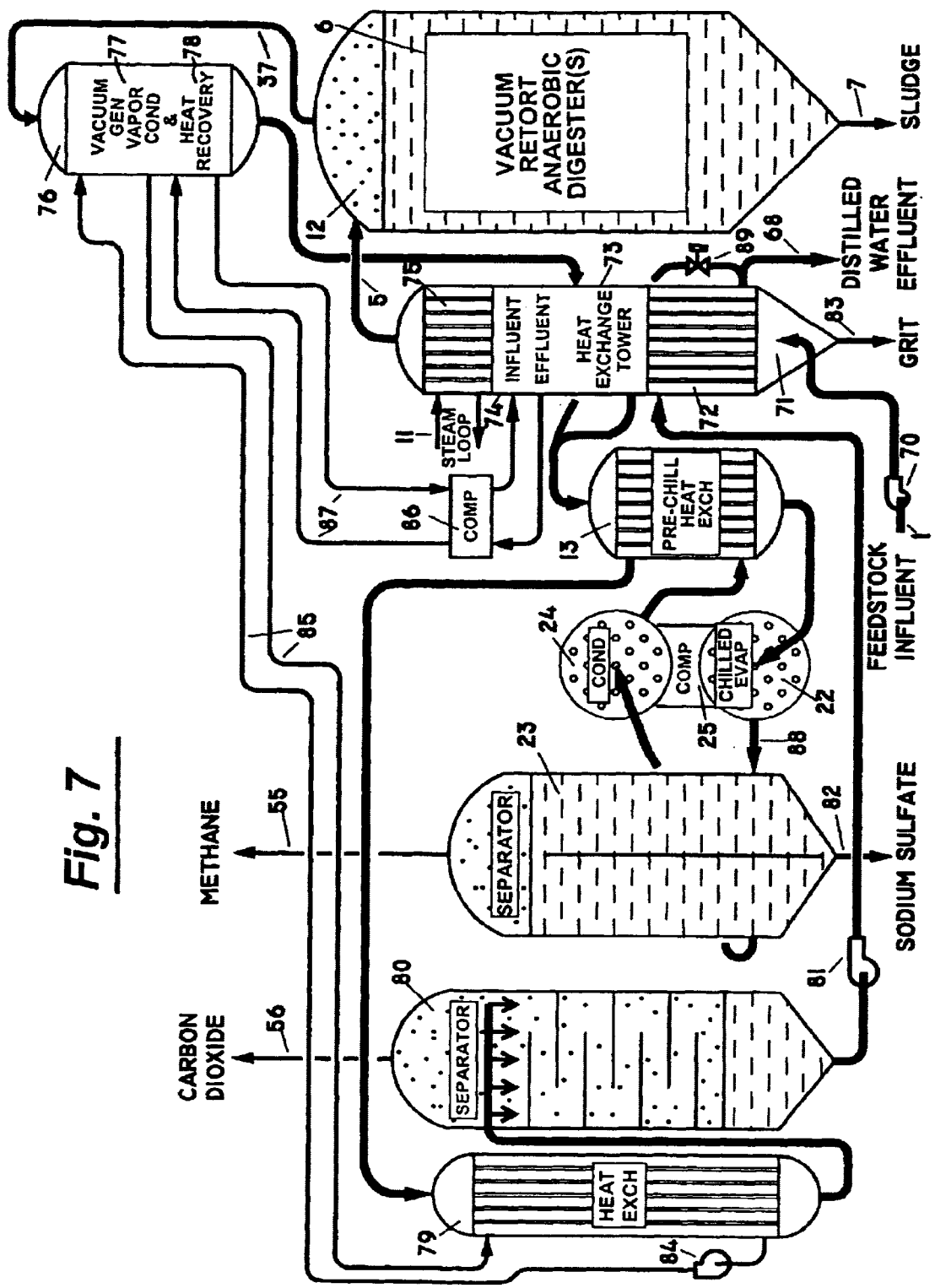
FIG. 7 is a hydraulic profile diagram of and similar to the embodiment of FIG. 6, utilizing the force of gravity to produce a vacuum in the retort dome. For convenience and clarity of illustration, details such as valves, indicators, sensors, pumps, and computers, are omitted from the drawings except as where necessary to clarify the action of the system and process. Likewise, commonly used pretreatment and preprocessing equipment such as mixers, screens, and grinders is not shown.

FIGS. 6 and 7 illustrate two similar systems which employ different methods of creating a vacuum in the dome of the digester. In the embodiment of FIG. 6, the vacuum created in the dome is a function of pumping as in the embodiments of FIGS. 1, 2, and 3. In the embodiment of FIG. 7, the vacuum is created in the dome by condensing the vapor at a distance above the dome equal to approximately one atmosphere of water column. The choice between the two can be made on the basis of factors such as capital and operating costs that may vary case to case.

In the embodiment of FIG. 6, liquefied biomass feedstock 1 (domestic and/or other) is progressively fed and heated through energy recovery heat exchanger 2, vacuum condenser 3, and hot water/steam heat exchanger 4, to enter the digester(s) dome 12, where the liquid/vapor fraction that is surplus to digester operation and the gasses produced by digestion are drawn off by the vacuum created from the combined action of condenser 3, pre-chiller heat exchanger 13, chiller evaporator 22, and gas diffusion pump of methane separator 23. A measured amount of sodium hydroxide solution 38 is injected into the vapor-gas vacuum line at the dome outlet 12 in order to neutralize the very active hydro-sulfuric acid formed by the hydrogen sulfide gas and water. This chemical reaction produces a useful by-product sodium sulfate (mirabilite) Na2SO4+10H2O that crystallizes at lower temperatures and is removed as a residue from methane separator 23. The distilled water and dissolved carbon dioxide are warmed as they pass through the condenser 24 of refrigeration compressor 25, pre-chiller 13. The bulk of the carbon dioxide gas is stripped from the water in separator 80, part of which goes to distribution in the system 56 and the balance is pumped to storage and sale via line 66. Water from separator 80 passes through energy recovery heat exchanger 2 and out of the system through line 68.

Boiling off the influent water 5 at or near the same rate which it arrives to the process 1 maintains a constant liquid level in the digester dome 12 and allows extended SRTs and maximizes methane production. Methane from distribution element 26 is used to control digester pH, power the boiler 9 and the electrical engine generator 10, and may be sold or used for other purposes via output line 27. Electrical power from engine generator 10 is directed to electrical distribution 29, thence to compressor 25 and other plant loads. Boiler 9 and heat jackets on engine generator 10 provide heat for the exchanger 4, digester 6, and vacuum sludge thickener oven 67. Sludge pump 69 supplies sludge-to-sludge cake vacuum oven 67 and vacuum line 44 carries away its vapor and gasses.

Digester mixing and control in this embodiment are similar to the mixing and control in the embodiments of FIGS. 4 and 5.

In the embodiment of FIG. 7, liquefied biomass feedstock 1 is pumped 70 into the base of shell and tube vertical heat exchange tower 71 where it passes through heat exchange sections 72, 73, 74, and 75 in which it is progressively heated until it is finally exited, through line 5 at an elevated temperature of from 55 to 100° C. Effluent in line 5 is directed into the vacuum dome 12 of one of several typical digester configurations 6 where it deposits its biomass solids to the digester 6. The bulk of effluent (nominally 95 to 99% water) either exits the dome directly in the form of water vapor or is added to the digester content as make up for digested sludge draw off 7. Water vapor and defused gases produced by digestion rise in vacuum line 37 and enter the second vertical heat exchange tower 76 where the vapor is cooled, condensed to water and progressively chilled in heat exchange sections 77 and 78. The condensing point in exchange tower 76 is maintained at approximately the distance of one atmosphere water column above dome 12 and the pipe velocities are maintained at above diffused gas bubbling point in order to keep the vacuum created by this arrangement from being broken.

Due to design flow rates and vapor to gas ratios this vacuum condition can be hard to control, in which case diffusion pumping at can be installed between evaporator 22 and separator 23, if desired.

Effluent from tower 76 enters exchange unit 73 of tower 71 where it is further step cooled before entering pre-chiller heat exchanger 13 and thence to chiller evaporator 22, where it emerges through line 88 at a temperature of 0 to 2° C. for separating the methane component in separater 23. Water and dissolved carbon dioxide flow from separator 23 to condenser 24 where heat removed by compressor 25 is replaced and then increased in pre-chiller 13 before being directed to heat-exchanger 79, where it is heated to 30° C. for carbon dioxide separation in separater 80. Water level in separator 80 is maintained by discharge pump 81 and passes through unit 73 of tower 71 to final effluent line 68.

Control valve 89 cycles distilled water back to pre-chiller heat exchanger when higher VS loadings produce more carbon dioxide than water from influent stream can dissolve. Carbon dioxide is removed for pH control and sale through 83. Methane is taken off at 55 to power the system, provide pH control in the digester and for sale or further utilization. Sodium sulfate precipitate is removed at 82 and sand/grit that may have entered the tower 71 is removed at 83. Pump 86 circulates heat generated in vapor condenser 77 to heat exchanger 79 through heating loop 85. Refrigeration compressor 85 removes heat from condensed vapor at evaporator 78 and supplies that heat to tower 71 at condenser exchanger 74 through refrigeration loop 87. Steam from boiler (FIG. 6) transmitted through loop 11 provides final heat to digester feedstock 1 at exchanger 75 of tower 71, and regulates the vaporization rate in dome 12 to meet digestion operational requirements.

The invention has a number of important features and advantages. It has the ability to process wastewaters in a simple, clean, closed system, and it can process an almost limitless variety of bio-waste substances with wide variations in biochemical oxygen demand. It produces a potable water effluent, clean commercially useful by-products, and zero environmental emissions, which means it has a very positive ecological impact. It can be completely self powered and provide energy back to the community or industry that supports or owns it. It will change forever the world's concept of the wastewater industry and is a major step forward in our society.

It is apparent from the foregoing that a new and improved anaerobic digester and process have been provided. The embodiments disclosed herein are only exemplary, and as will be readily apparent to those skilled in the art, differences such as variations in flow path, location of heat exchange units and other auxiliary process equipment will occur in order to meet the requirements of each individual installation such as the type and density of feedstock, feed rate, the final moisture content desired in the effluent sludge, and the relative economic importance of overall digestion efficiency and system byproducts.

What is claimed is:

1. In an anaerobic digestion system:
   a retort vessel containing a liquor comprising a liquid and a digestible biomass, means for maintaining the liquor at a thermophilic temperature, a space above the liquor in which liquid vapor and gaseous products of digestion can collect, means including a condenser, a chiller and a pump for removing the gaseous products of digestion and the liquid vapor from the vessel and thereby creating a vacuum which lowers the pressure at the surface of the liquor and causes the liquid to boil and vaporize at the thermophilic temperature.

2. The system of claim 1 further including means for introducing a raw sludge influent into the vessel above the liquor, and means for receiving sludge effluent from the lower portion of the vessel.

3. The system of claim 1 further including means for reducing the temperature of the condensed liquid vapor to dissolve gaseous components therein.

4. The system of claim 1 further including a vacuum oven for drying the sludge effluent into a sludge cake outside the retort vessel.

5. In an anaerobic digestion system:
   a retort vessel containing digestible biomass solids in a liquor, a dome above the liquor containing a vapor and gaseous products of digestion, means for condensing the vapor at a distance above the dome equal to approximately one atmosphere of water column to create a vacuum at the surface of the liquor which vaporizes the liquor and concentrates the biomass solids, and means for removing the gaseous products and the vaporized liquor from the enclosed space.

6. The system of claim 5 wherein the liquor is water.

7. The system of claim 5 including means for heating the liquor externally of the enclosed space in order to promote concentration of the biomass solids.

8. The system of claim 5 wherein the gaseous products of digestion include hydrogen sulfide, carbon dioxide and methane.

9. The system of claim 5 including means for introducing the biomass solids into the dome at a temperature/pressure gradient above the vaporization point of the liquor.

10. The system of claim 5 further including means for introducing a raw sludge influent into the vessel above the liquor, and means for receiving sludge effluent from the lower portion of the vessel.

11. The system of claim 5 further including means for reducing the temperature of the condensed vapor to dissolve gaseous components therein.

12. The system of claim 11 wherein the gaseous components to be dissolved are selected from the group consisting of hydrogen sulfide, carbon dioxide, and mixtures thereof.

13. The system of claim 5 including means for dissolving any hydrogen sulfide in the gaseous components into the liquor, and means for adding a caustic component to neutralize hydrosulfuric acid formed by hydrogen and sulfur ions.

14. The system of claim 13 wherein the means for adding a caustic component includes means for adding sodium hydroxide to form a salt that precipitates from solution in crystalline form at low temperatures, and further including means for removing the salt from the vessel.

15. The system of claim 5 further including means for releasing the surface tension of the liquor so that methane gas can bubble off.

16. The system of claim 5 further including means for reheating the liquor and releasing the surface tension of the liquor to allow carbon dioxide gas to bubble off.

17. In an anaerobic digestion process, the steps of: introducing a raw sludge influent into a retort vessel containing a liquor of digestible biomass solids in a liquid, with a vapor and gaseous products of digestion collecting in a space above the liquor, maintaining the liquor at a thermophilic temperature, and removing the gaseous products of digestion and the liquid vapor from the vessel in a manner that creates a vacuum at the surface of the liquor to vaporize the liquid and concentrate the biomass solids.

18. The process of claim 17 wherein the gaseous products of digestion and the liquid vapor are pumped from the space above the liquor, condensed and cooled to create the vacuum at the surface of the liquor.

19. The process of claim 17 including the step of heating the liquor externally of the enclosed space in order to promote concentration of the biomass solids.

20. The process of claim 17 wherein the gaseous products of digestion include hydrogen sulfide, carbon dioxide and methane.

21. The process of claim 17 including the step of introducing the biomass solids into the space above the liquor at a temperature/pressure gradient above the vaporization point of the liquor.

22. The process of claim 17 wherein the vacuum is produced at the surface of the liquor by condensing the vapor at a distance above the surface equal to approximately one atmosphere of water column.

23. The process of claim 17 further including the step of reducing the temperature of the condensed vapor to dissolve gaseous components therein.

24. The process of claim 23 wherein the gaseous components to be dissolved are selected from the group consisting of hydrogen sulfide, carbon dioxide, and mixtures thereon.

25. The process of claim 17 including the steps of dissolving any hydrogen sulfide in the gaseous components into the liquor, and adding a caustic component to neutralize hydrosulfuric acid formed by hydrogen and sulfur ions.

26. The process of claim 25 wherein the caustic component is added by adding sodium hydroxide to form a salt that precipitates from solution in crystalline form at low temperatures, and removing the salt from the vessel.

27. The process of claim 17 further including the step of releasing the surface tension of the liquor so that methane gas can bubble off.

28. The process of claim 17 further including the steps of reheating the liquor and releasing the surface tension of the liquor to allow carbon dioxide gas to bubble off.

29. The process of claim 17 including the step of maintaining the liquor in the vessel at a thermophilic temperature, with the vacuum created by removing the gaseous products of digestion and the liquid vapor reducing the pressure at the surface of the liquor to a level such that the liquid boils at the thermophilic temperature.

* * * * *